(12) United States Patent
Almaiman et al.

(10) Patent No.: US 10,270,536 B2
(45) Date of Patent: Apr. 23, 2019

(54) PHASE-SENSITIVE REGENERATION WITHOUT A PHASE-LOCKED LOOP USING BRILLOUIN AMPLIFICATION

(71) Applicant: University of Southern California, Los Angeles, CA (US)

(72) Inventors: Ahmed Almaiman, Los Angeles, CA (US); Alan E. Willner, Los Angeles, CA (US); Yinwen Cao, Los Angeles, CA (US); Morteza Ziyadi, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 15/464,180

(22) Filed: Mar. 20, 2017

(65) Prior Publication Data
US 2017/0272171 A1    Sep. 21, 2017

Related U.S. Application Data

(60) Provisional application No. 62/311,104, filed on Mar. 21, 2016.

(51) Int. Cl.
*H04B 10/556* (2013.01)
*H04B 10/291* (2013.01)
*H04L 7/033* (2006.01)
*H04B 10/2507* (2013.01)

(52) U.S. Cl.
CPC ....... *H04B 10/556* (2013.01); *H04B 10/2507* (2013.01); *H04B 10/2916* (2013.01); *H04L 7/0331* (2013.01)

(58) Field of Classification Search
None
See application file for complete search history.

(56) References Cited

U.S. PATENT DOCUMENTS

| | | | | |
|---|---|---|---|---|
| 6,476,959 | B2 * | 11/2002 | Yao | H01S 3/302 359/334 |
| 6,597,826 | B1 * | 7/2003 | Ramaswami | H04J 14/0293 385/15 |
| 2011/0122912 | A1 * | 5/2011 | Benjamin | H01S 5/4006 372/50.124 |
| 2013/0208334 | A1 * | 8/2013 | Kakande | H04B 10/291 359/246 |
| 2014/0083197 | A1 * | 3/2014 | Zadok | H04B 10/071 73/800 |

\* cited by examiner

*Primary Examiner* — Kenneth N Vanderpuye
*Assistant Examiner* — David W Lambert
(74) *Attorney, Agent, or Firm* — Snell & Wilmer LLP

(57) ABSTRACT

Methods, systems, and apparatus for phase-sensitive regeneration of a signal without a phase-locked loop and using Brillouin amplification. The system for phase-sensitive regeneration includes a data channel, one or more pumps and a mixing stage. The one or more pumps are coupled with the data channel. The mixing stage is coupled with the data channel and is for processing a data signal that is combined with an output of the one or more pumps and idler or higher harmonic. The mixing stage is configured to amplify the idler or higher harmonic using Brillouin amplification in a Brillouin gain medium to keep the one or more pumps and the data channel phase-locked.

18 Claims, 16 Drawing Sheets

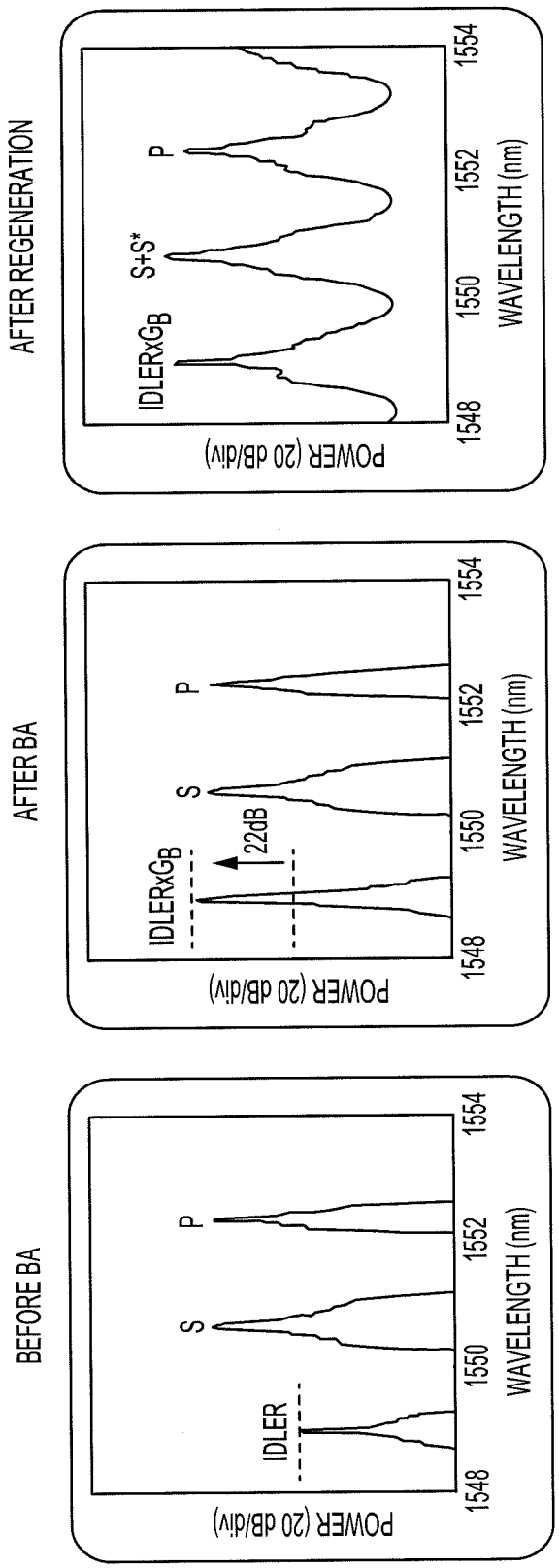

PHASE-SENSITIVE REGENERATION WITHOUT A PHASE-LOCKED LOOP USING BRILLOUIN AMPLIFICATION

CROSS-REFERENCE TO RELATED APPLICATIONS

This application claims priority to and the benefit of U.S. Provisional Application No. 62/311,104, titled "PHASE-SENSITIVE REGENERATION WITHOUT A PHASE-LOCKED LOOP USING BRILLOUIN AMPLIFICATION," filed on Mar. 21, 2016, and the entirety of which is hereby incorporated by reference herein.

STATEMENT REGARDING GOVERNMENT RIGHTS

This invention was made with Government support under Contract Nos. ECCS1202575 and EEC0812072 awarded by the National Science Foundation (NSF), acknowledgement is made to the National Science Foundation Center for Integrated Access Networks (NSF CIAN). The Government has certain rights in this invention.

BACKGROUND

1. Field

This specification relates to a system for performing phase-sensitive regeneration without a phase-locked loop.

2. Description of the Related Art

All-optical regeneration of phase-shift-keyed (PSK) data channels reduce phase noise and increase communication system performance. Phase-dependent data modulation formats for optical communication systems provide tolerance to nonlinear effects and spectral efficiency. Phase-modulated data channels may benefit from optical regeneration to avoid full optical-electrical-optical conversion in long distance systems. Phase-sensitive amplification (PSA) may be used to attenuate or squeeze the phase noise. Two pumps and a data channel mix with each other, but this mixing is efficient only when the pumps and the data channel have the same phase and are coherent with each other. The part of the signal that is a different phase from the pumps, such as the phase noise, will be "squeezed" or attenuated. Various approaches for phase-locking the pumps and the data channel include: (i) using a phase-locked loop (PLL) to adjust the relative phase alignment, and (ii) using a comb of mutually coherent frequency lines as well as cross-phase modulation between one of the comb lines and the data channel.

Accordingly, there is a need for a system and method to phase-lock the signal without a PLL.

SUMMARY

In general one aspect of the subject matter described in this specification is embodied in a system for phase-sensitive regeneration. The system includes a data channel, one or more pumps and a mixing stage. The one or more pumps are coupled with the data channel. The mixing stage is coupled with the data channel and is for processing a data signal that is combined with an output of the one or more pumps and idler or higher harmonic. The mixing stage is configured to amplify the idler or higher harmonic using Brillouin amplification in a Brillouin gain medium to keep the one or more pumps and the data channel phase-locked.

These and other embodiments may include one or more of the following features. The Brillouin gain medium may be formed from material, such as glass, silica, or silicon, or optical fibers including highly nonlinear fibers, dispersion shifter fibers, dispersion stable fibers or dispersion compensating fibers, where the idler or higher harmonic is amplified using a counter propagating Brillouin pump. The mixing stage may include a first nonlinear mixing device to generate the idler or higher harmonic and a second nonlinear mixing device to generate and add a conjugate signal or higher harmonic to the signal to perform phase regeneration. The first nonlinear mixing device and the second nonlinear mixing device are made from $a_\chi 2$ or $_\chi 3$ material or other nonlinear material. The mixing stage may include a coupler for splitting the data channel into at least two paths including a first path and a second path. The first path may include the Brillouin gain medium and the second path may include a slave laser. The slave laser may be configured to generate a frequency locked Brillouin amplified pump that amplifies the idler or higher harmonic. The second path may include a frequency shifter that frequency up-shifts the idler or higher harmonic by a Brillouin gain frequency shift. The second path may include a filter that filters the idler or higher harmonic from the combined signal. The data channel may carry a phase-shift-keyed (PSK) data signal. The mixing stage may include at least one of an isolator or a circulator for directing the data signal in a single direction or a liquid crystal on silicon filter for blocking a harmonic and attenuating the data signal.

In another aspect, the subject matter is embodied in a system for phase-sensitive regeneration. The system includes a data channel for carrying a signal. The system includes one or more pumps coupled with the data channel and configured to output a pump. The system includes a first nonlinear material coupled with the data channel for processing the signal that is combined with the pump and configured to generate and combine an idler or higher harmonic with the pump and the signal. The system includes a coupled to split the combined signal into multiple paths including a first path and a second path. The system includes a filter in the second path for filtering the idler or higher harmonic from the combined signal and a slave laser in the second path for amplifying the idler or higher harmonic.

In another aspect, the subject matter is embodied in a method for phase-sensitive regeneration of a signal. The method includes generating, using a first nonlinear material, an idler or higher harmonic for the signal. The method includes splitting, using a coupler, the signal into at least two paths including a first path and a second path. The method includes amplifying, in the second path and using a slave laser, the idler or higher harmonic by a gain. The method includes frequency up-shifting, in the second path and using a frequency shifter, the idler or the higher harmonic by a Brillouin gain frequency shift. The method includes providing, in the second path and using the frequency shifter, the up-shifted signal to the gain medium as a counter propagating Brillouin pump.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 6A is a graph of the spectrum of the signal using the experimental setup of FIG. 5 before Brillouin amplification according to an aspect of the invention;

FIG. 6B is a graph of the spectrum of the signal using the experimental setup of FIG. 5 after Brillouin amplification according to an aspect of the invention;

FIG. 6C is a graph of the spectrum of the BPSK signals using the experimental setup of FIG. 5 after phase regeneration according to an aspect of the invention;

DETAILED DESCRIPTION

Disclosed herein are systems and methods for a reducing phase noise to increase communication system performance. Particular embodiments of the subject matter described in this specification may be implemented to realize one or more of the following advantages. A phase-regeneration system that performs phase-regeneration without a phase-locked loop using Brillouin Amplification.

A phase-regeneration system that performs phase-regeneration without a phase-locked loop using Brillouin Amplification. Typically, a phase-regeneration system has a phase-locked loop (PLL) to adjust the relative phase alignment when mixing the pumps and the data channel so that the signal, such as an optical signal, is phase-locked and coherent. Thus, the portion of the signal with a different phase is "squeezed" out or attenuated so that signal is clean. Phase-locked loops are inherently noise sensitive. By using Brillouin amplification (BA) and not requiring a phase-locked loop to perform phase regeneration, the phase-regeneration system attenuates or reduces the phase noise with less noise sensitivity.

Other benefits and advantages include that the phase-regeneration system without phase-locked loop does not require the expensive, high quality components that implement the loop-filter design of the phase-locked loop. As such, the phase-regeneration system without the phase-locked loop using Brillouin amplification reduces cost.

Figure 1:
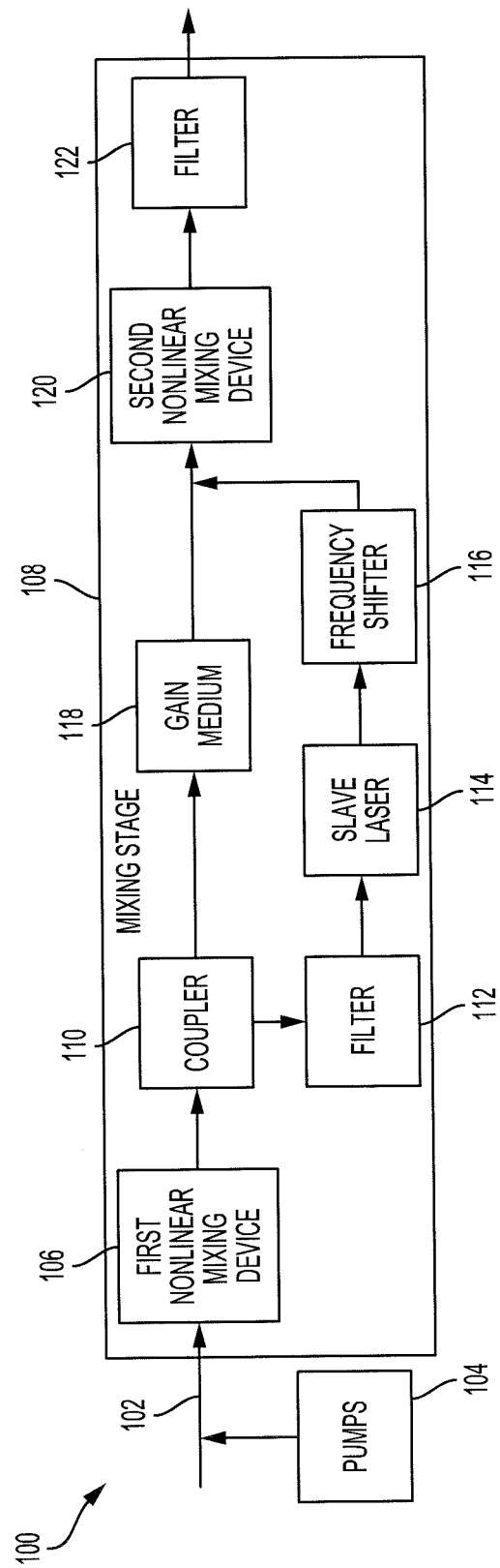
FIG. 1 is a block diagram of a phase-regeneration system without a phase-locked loop and using Brillouin amplification according to an aspect of the invention.

FIG. 1 is a block diagram of a phase-regeneration system 100 without a phase-locked loop (PLL) using Brillouin amplification. The phase-regeneration system 100 includes a data channel 102, one or more pumps 104, and a mixing stage 108.

Figure 2:
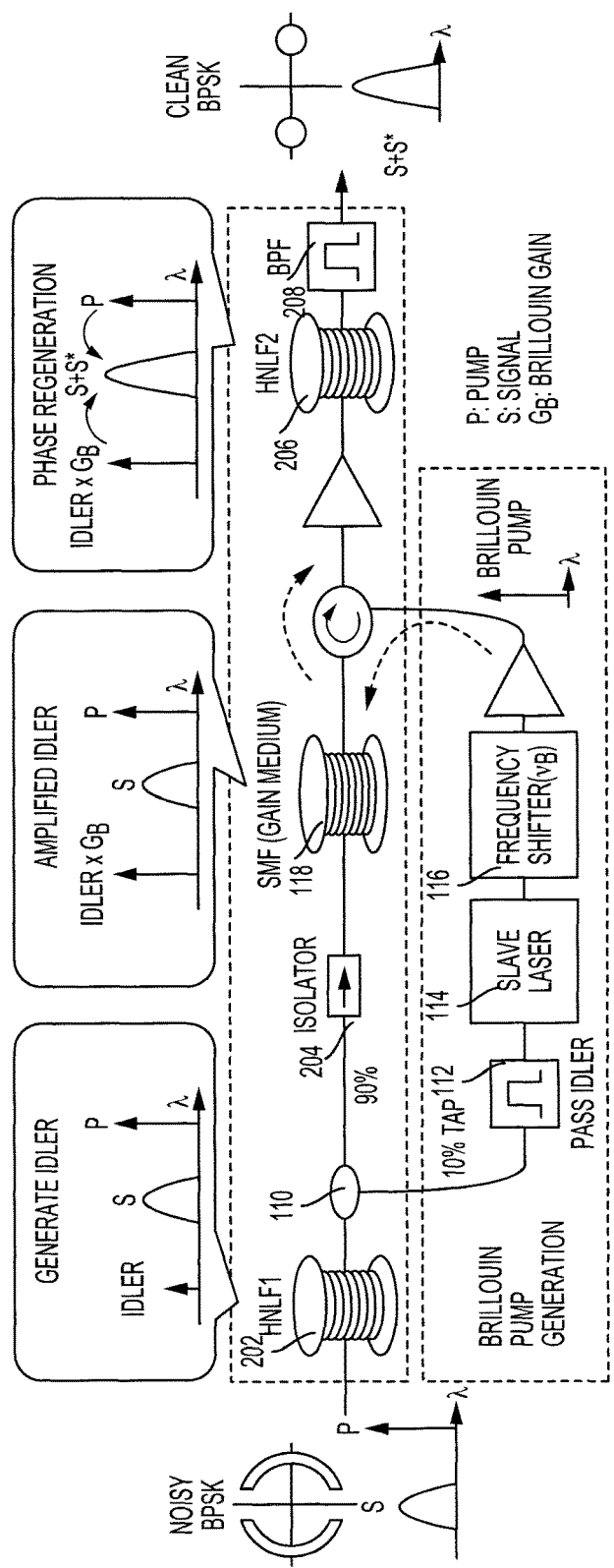
FIG. 2 is a circuit diagram of a phase-regeneration system carrying a bipolar phase-shift-keying (BPSK) signal according to an aspect of the invention.
Figure 3:
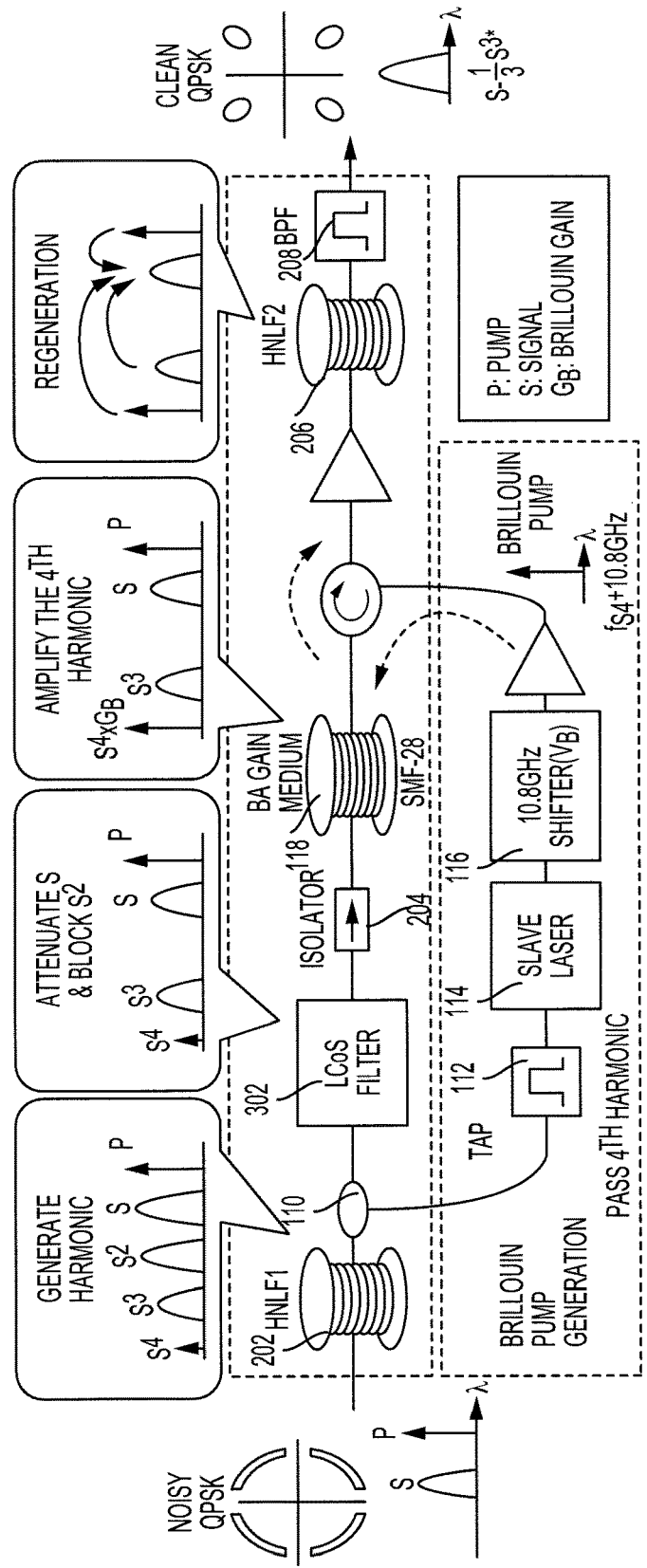
FIG. 3 is a circuit diagram of a phase regeneration system carrying a quadrature phase-shift-keying (QPSK) signal according to an aspect of the invention.

The phase-regeneration system 100 includes the data channel 102 that carries a signal, such as an optical signal. The data channel 102 may be a phase-shift-keyed (PSK) data channel and have a PSK signal that may be degraded with phase noise. The PSK data channel may have any number of phases. The data channel may be a bipolar PSK (BPSK) channel, e.g., a 10-20 Gigabit/second (Gb/s) BPSK channel, a quadrature PSK (QPSK) channel, e.g., a 20-40 Gb/s QPSK channel, or have any other number of phases. For example, a 1-kHz line-width laser may be modulated with a BPSK signal at 10 Gb/s and 20 Gb/s using a Mach-Zehnder modulator (MZM). FIG. 2 shows a phase-regeneration system 100 that is implemented with a BPSK signal, and FIG. 3 shows a phase-regeneration system 100 that is implemented with a QPSK signal.

The phase-regeneration system 100 includes the one or more pumps 104 (or pump lasers) that are connected to the data channel 102. The one or more pumps 104 may be a continuous wave (CW) pump ("pump"). The CW pump is combined with the PSK signal that is in the data channel 102. The combined signal and pump are fed into the mixing stage 108.

The phase-regeneration system 100 includes the mixing stage 108. The mixing stage 108 obtains the combined signal to clean, "squeeze" or attenuate the phase noise from the signal. The mixing stage 108 may include a first nonlinear mixing device 106, a coupler 110, a Brillouin Amplification (BA) gain medium 118 ("gain medium"), a second nonlinear mixing device 120, one or more filters 112, 122, a slave laser 114 and a frequency shifter 116. The mixing stage 108 obtains the combined signal with the phase noise and cleans the signal of the phase noise by attenuating the phase noise to produce a clean signal.

The mixing stage 108 may include the first nonlinear mixing device 106. The first nonlinear mixing device 106 may be a highly nonlinear fiber (HNLF1) 202 or a device made from an $\chi 2$ or $\chi 3$ material or other nonlinear material including silicon nanowire waveguides, semiconductor optical amplifiers, periodically poled lithium niobate (ppln), chalcogenide waveguide, and photonic crystals. The first nonlinear mixing device 106 receives the signal that is combined with the pump and generates higher harmonics or an idler that may be added to the pump and signal. The idler or higher harmonic is a frequency component of the combined signal.

The mixing stage 108 may include the coupler 110. The coupler 110, e.g., a 90/10 coupler, splits the signal with the pump, idler and/or higher harmonics into multiple paths, e.g., two paths. A 90/10 coupler may split the power of the combined signal that includes the signal, pump, idler and/or higher harmonics into two paths. The first path is a 90% tap where 90% of the power flows into the first path and the second path is a 10% tap where 10% of the power flows into the second path. The percentage of tap or power of the combined signal that flows into each path may vary.

The first path of the mixing stage 108 may include an isolator 204 or circulator, a filter and/or a gain medium 118. The isolator 204 or circulator permits the transmission of the combined signal in a single direction toward the gain medium 118. The isolator 204 or circulator may prevent unwanted feedback.

The first path of the mixing stage 108 may have a filter that performs adjustment of the power levels and relative phases of the combined signal. The filter may be a Liquid Crystal on Silicon (LCoS) filter 302. The filter may attenuate the signal and block one or more of the higher harmonics of the signal that were generated by the first nonlinear mixing device 106. For example, the LCoS filter 302 may block the second harmonic of a QPSK signal that is generated by the HNLF1 202. Afterwards, the higher harmonic or idler is amplified by the gain medium 118.

The gain medium 118 may be a single mode fiber (SMF) Brillouin gain medium that provides a gain, $G_B$, that amplifies the idler, e.g., when the idler is combined with the BPSK signal. The gain medium 118 may provide the gain to a higher harmonic, such as the fourth harmonic, $S^4$, when the third harmonic is combined with the QPSK signal, using the counter-propagating Brillouin pump. The amplification occurs without path separation and phase relationships between the pump, signal and amplified idler or higher harmonic remain locked allowing stable phase regeneration without the phase-locked loop (PLL). The pump, signal and amplified idler or higher harmonic propagates through the same path through the gain medium 118, and thus, are phase-locked without a PLL. In some implementations, the gain medium 118 may be formed from other material, such as glass or silicon materials, or other types of optical fibers including highly nonlinear fibers, dispersion shifter fibers, dispersion stable fibers, or dispersion compensating fibers. In some implementations, the Brillouin gain occurs in embedded waveguides, suspended waveguides, and/or resonators.

The second path of the mixing stage 108 may include the filter 112, the slave laser 114 and/or the frequency shifter 116. The second path of the mixing stage 108 generates the frequency-locked idler or higher harmonic. The filter 112 may pass the idler when a BPSK signal is being phase-regenerated or pass a higher harmonic, such as the fourth harmonic, when a QPSK signal is being phase-regenerated. That is, the filter 112 filters out the idler or higher harmonic from the combined signal that has the idler, signal and pump. The filtered idler or higher harmonic from the filter 112 is provided to the slave laser 114.

The slave laser 114, or other high-power laser, may be configured to frequency-lock to the tapped idler or higher harmonic. The slave laser 114 has an input that receives the idler or higher harmonic from the filter 112. The slave laser 114 provides amplification and a very narrow bandwidth filtration of the idler or higher harmonic. The slave laser 114 outputs the filtered and amplified idler or higher harmonic to a frequency shifter 116 to be up-shifted.

The frequency shifter 116 up-shifts the idler or the higher harmonic to form the counter-propagating Brillouin pump. The frequency shifter 116 may up-shift the idler or the higher harmonic by a predetermined frequency, $v_B$, or Brillouin gain frequency of the gain medium 118. The predetermined frequency may be 10.8 GHz. The predetermined frequency may be based on the material of the gain medium 118.

After propagating through the gain medium 118, the combined signal including the signal, the pump and the amplified idler or higher harmonic is provided to an Erbium Doped Fiber Amplifier (EDFA) for amplification. The EDFA amplifies the combined signal and sends the combined signal to a second nonlinear mixing device 120 for phase regeneration.

The second nonlinear mixing device 120 generates the conjugate signal. The second nonlinear mixing device 120 may be a second highly nonlinear fiber (HNLF2) 206. The output of the second nonlinear mixing device 120 may feed into a filter 122.

The filter 122 may receive the output signal from the second nonlinear mixing device 120 that had the phase noise "squeezed" or attenuated. The filter 122 may be a bandpass filter 208 and may filter out the phase-regenerated output signal to send the phase-regenerated output signal to a receiver.

Figure 4:
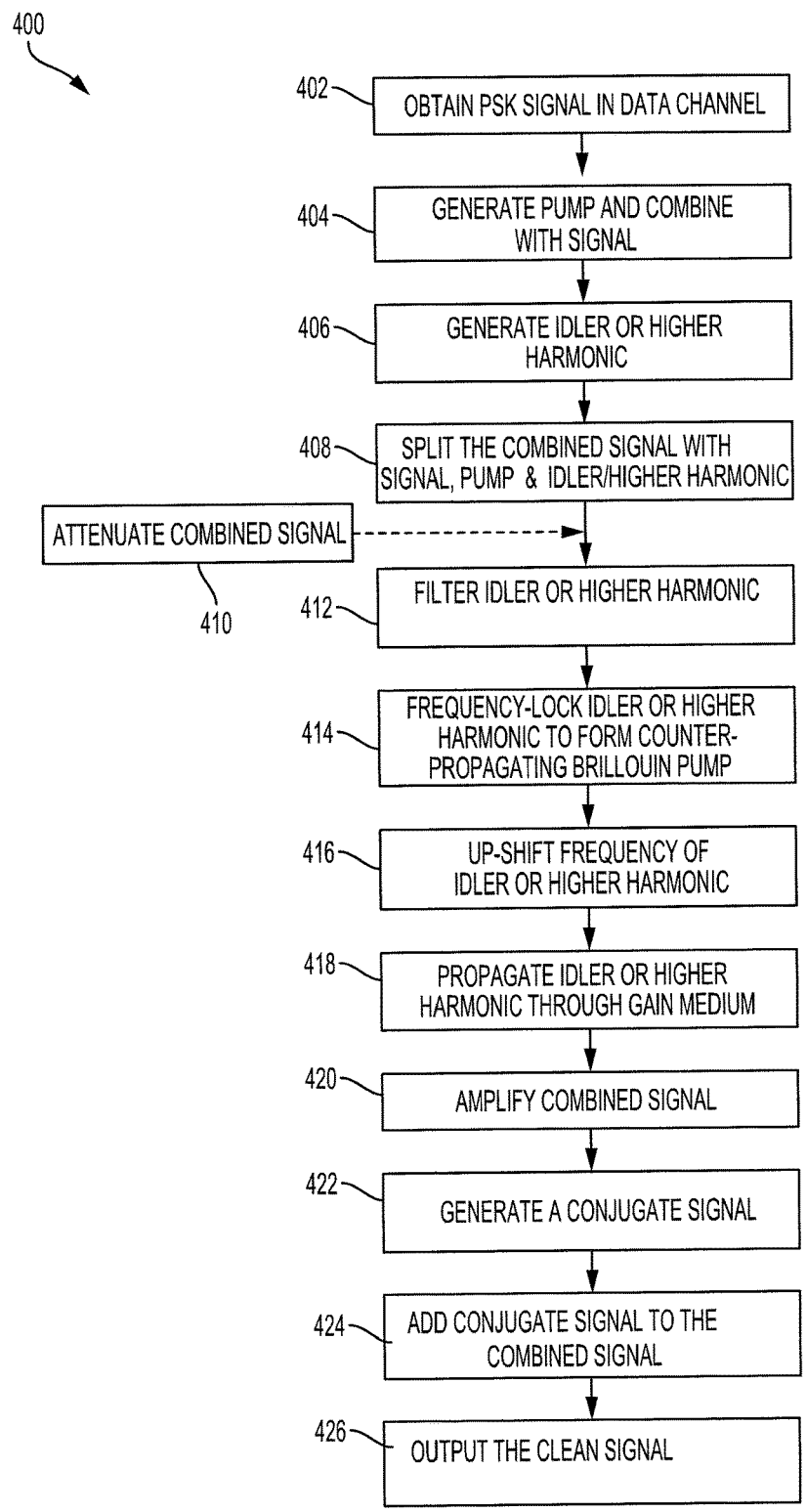
FIG. 4 is a flow diagram of an example process for performing phase-regeneration of a signal without a phase-locked loop (PLL) using Brillouin amplification according to an aspect of the invention.

FIG. 4 is a flow diagram of a process 400 for performing phase-regeneration of a signal without a phase-locked loop (PLL) using Brillouin amplification. The phase-regeneration system 100 may implement the process 400 to perform phase-regeneration of the signal. The phase-regeneration system 100 may perform all-optical regeneration of a PSK data channel that has a PSK signal that may be degraded with phase noise.

The phase-regeneration system 100 obtains the PSK signal, e.g., a QPSK or BPSK signal, in the data channel 102 (402). In a PSK signal, the information is encoded on the phase of the optical wave. The PSK signal in the data channel 102 may have any number of phases. The phase-regeneration system 100 generates a pump (P) and combines the pump with the signal (S), e.g., the QPSK or BPSK signal, in the data channel 102 (404). The pump may be generated by one or more pumps 104, such as a CW pump.

The phase-regeneration system 100 generates an idler or higher harmonic for the combined signal (406). The first nonlinear mixing device 106, such as the HNLF1 202, of the phase-regeneration system 100 may generate the idler, such as for a BPSK signal, or the higher harmonics, such as the second ($S^2$), third ($S^3$) and/or fourth harmonics ($S^4$) for a QPSK signal. If the signal is a BPSK signal, the first nonlinear mixing device 106 may generate the idler with a phase $\varphi_{idler}=2\varphi_{signal}-\varphi_{pump}$, whereas, if the signal is a QPSK signal, the first nonlinear mixing device 106 may generate the higher harmonics. The first nonlinear mixing device 106 outputs and combines the idler or higher harmonics with the pump and signal and outputs the combined signal that includes the idler or higher harmonic, the pump and the signal to the coupler 110.

The phase-regeneration system 100 splits the combined signal into at least two paths using the coupler 110 (408). The coupler 110 may split the combined signal into a first path that is a 90% tap and a second path that is a 10% tap.

The phase-regeneration system 100 may attenuate the signal and block one of the higher harmonics using a filter (410), such as a LCoS filter 302. For example, the phase-regeneration system 100 may block the second harmonic and attenuate the signal in a first path. The phase-regeneration system 100 may have an isolator 204 or circulator that permits the transmission of the signal in a single direction toward the gain medium 118 to prevent feedback.

The phase-regeneration system 100 filters the idler or the higher harmonic from the combined signal (412). The phase-regeneration system 100 may filter the idler or the higher harmonic of the combined signal using a filter 112. The filter 112 may pass the idler, when the BPSK signal is in the data channel 102, or the higher harmonic, such as the fourth harmonic when the QPSK is in the data channel 102. The filter 112 filters out the idler or the higher harmonic from the combined signal that includes the signal, pump and the idler or higher harmonics.

The phase-regeneration system 100 further filters and amplifies the idler or the higher harmonic and frequency locks the idler or the higher harmonic using the slave laser 114 (414). The phase-regeneration system 100 frequency locks the idler or higher harmonic to reduce or attenuate the phase noise. The phase-regeneration system 100 frequency-locks the idler or the higher harmonic to ensure the stable frequency-locking needed for Brillouin interaction to produce the clean idler or higher harmonic.

The phase-regeneration system 100 shifts the frequency of the idler or the higher harmonic (416). The phase-regeneration system 100 may up-shift the idler or the higher harmonic by a predetermined gain frequency shift, such as a Brillouin gain frequency of the SMF. The Brillouin gain frequency may be based on the temperature and conditions of the gain medium 118. The Brillouin gain frequency may be optimized to maximize the gain of the Brillouin amplification, maximize the phase regeneration performance and minimize any noise resulting from the Brillouin amplification. The output of the frequency shifter is the counter-propagating Brillouin Pump. The Brillouin pump includes the idler that is filtered, amplified, cleaned of noise and frequency shifted. The Brillouin pump is sent as a counter-propagating pump to the gain medium to produce the gain on the idler or the higher harmonic.

The phase-regeneration system 100 propagates the idler or higher harmonic through the gain medium 118, such as the SMF, to amplify the idler or higher harmonic (418). The gain medium 118 adds a gain, $G_B$, using the counter propagating Brillouin pump, to the idler, when the signal is a BPSK signal, or to the fourth harmonic, when the signal is a QPSK signal, which amplifies the idler or higher harmonic. In some implementations, the phase-regeneration system 100 may cascade one or more Brillouin pumps to amplify multiple frequency components of the signal.

The phase-regeneration system 100 amplifies the combined signal that has the signal, the pump and the amplified idler or higher harmonic (420). The phase-regeneration system 100 may have an EDFA that amplifies the signal, the pump and the amplified idler or higher harmonic, e.g., the fourth harmonic, and send the combined signal to a second nonlinear mixing device 120 for phase regeneration. The phase of the higher harmonic remains locked to the other harmonics since the higher harmonic is not separated from the other harmonics.

The phase-regeneration system 100 generates a conjugate signal using a second nonlinear mixing device 120 (422) and adds the conjugate signal to the combined signal (424) to perform phase regeneration. The conjugate signal squeezes the phase of the signal. If the signal is the BPSK signal, the conjugate signal (S*) is generated through the Four-Wave Mixing (FWM) as $\varphi_{S*}=\varphi_{pump}+\varphi_{idler}-\varphi_{signal}$ and constructively added to the signal. The output becomes proportional to S+S* and the phase noise would be "squeezed." If the signal is the QPSK signal, the conjugate signal of the third harmonic ($S^{3*}$) is created through the FWM as $\varphi_{S3}*=\varphi_{pump}+\varphi_{S4}-\varphi_{S3}$ and destructively added to the signal as $S-\frac{1}{3}S^{3*}$ so that the phase noise is squeezed. The combined signal with the phase noise attenuated or "squeezed" is a "clean" signal. The phase-regeneration system 100 outputs the clean signal to a receiver (426).

Figure 5:
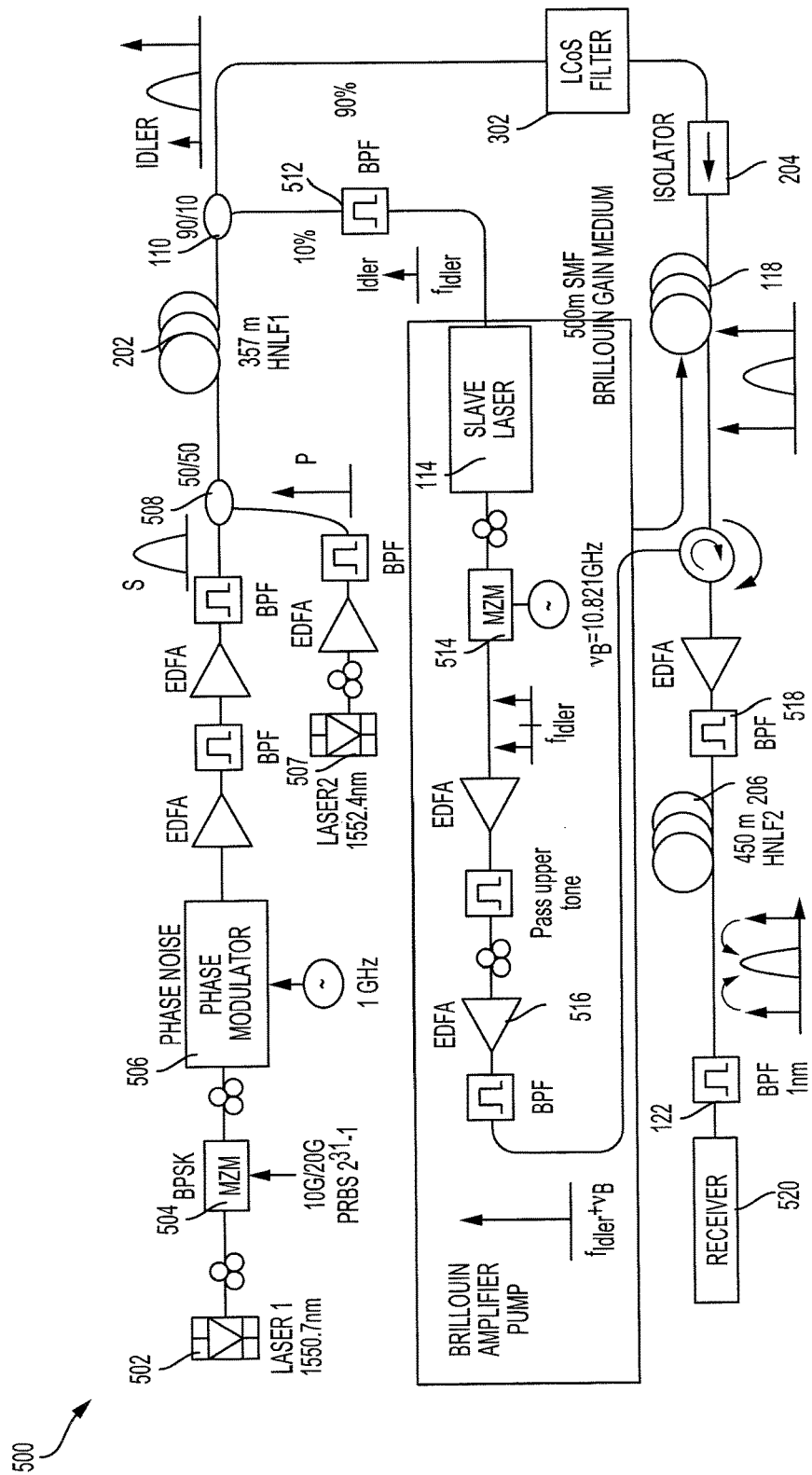
FIG. 5 is a system diagram of an experimental setup of the phase regeneration system of FIG. 2 that carries the BPSK signal according to an aspect of the invention.

FIG. 5 is a system diagram 500 of an experimental setup of the phase regeneration system 100 of FIG. 2 that carries the BPSK signal. The experimental setup that is depicted in FIG. 5 uses a modulated 1-kHz line-width laser 502 at 1550.7 nm with BPSK Non-Return-to-Zero modulation (NRZ) data at 10 Gb/s and 20 Gb/s using a $2^{31}-1$ Pseudo-Random Binary Sequence (PRBS) pattern in a Mach-Zehnder modulator (MZM) 504. The phase noise is loaded using a phase modulator 506 driven by a 1 GHz tone. The signal and a CW pump 507 at 1552.4 nm are amplified, combined in a 50/50 coupler 508, and then sent together into a 357 m HNLF1 202 with a zero-dispersion wavelength (ZDW) of 1545 nm, where the signal and pump power levels are 18.6 dBm and 17.1 dBm, respectively. The signal and pump lasers are independent and each laser has a ±50 MHz wavelength stability over an hour.

The HNLF1 output is split into two paths using a 90/10 coupler 110. On the 90% path, an LCoS filter 302 is used to perform adjustment of the power levels and relative phases. The output of the LCoS filter 302, as shown in FIG. 6A, is sent into the 500 m SMF Brillouin gain medium 118. On the 10% path, the Brillouin amplifier pump is generated by selecting the idler in using a filter 112, such as a bandpass filter (BPF) 512, and adjusting a slave laser 114 (e.g., injection-locked laser) to frequency-lock to the idler. The slave laser 114 is able to track the idler within a ±300 MHz locking range (Eblana photonics 1550-NLW). The output of the slave laser 114 is then frequency up-shifted in a frequency shifter 116, such as a MZM 514, biased at null and fed with a $v_B=10.821$ GHz tone. A sharp filter is then used to pass only the upper tone needed for Brillouin amplification, which is boosted in an EDFA 516 and filtered before reaching the 500 m SMF with a power of 20.2 dBm. FIG. 6B shows the spectrum after the Brillouin amplification where the idler has a 22 dB gain.

Finally, the pump, signal and idler are amplified in an EDFA 518, set to 29 dBm, and sent into the regeneration stage of a 450 m HNLF2 206 with a ZDW of 1556 nm. FIG. 6C depicts the spectrum after the HNLF2 regeneration. The regenerated output signal is filtered and sent to an 80 G sample/s coherent receiver 520 for analysis.

Figure 7A:
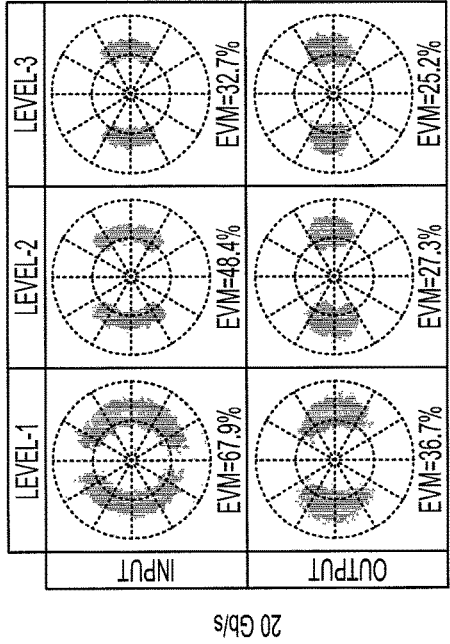
FIGS. 7A-7B are constellation graphs of the 10 Gb/s signal and 20 Gb/s signal, respectively, before and after phase-sensitive regeneration at different phase levels according to an aspect of the invention.
Figure 7B:
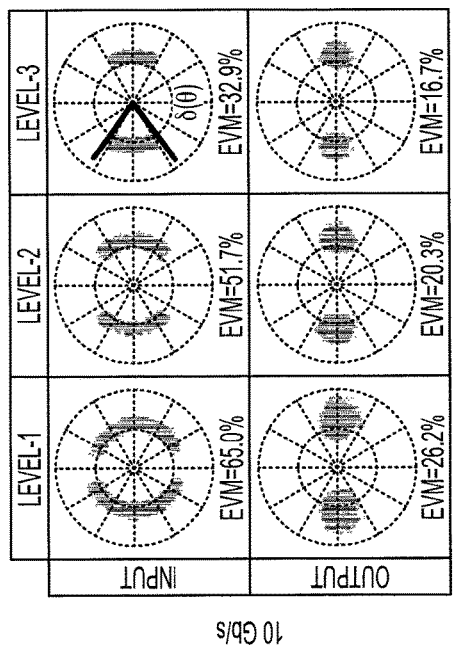
Figure 7C:
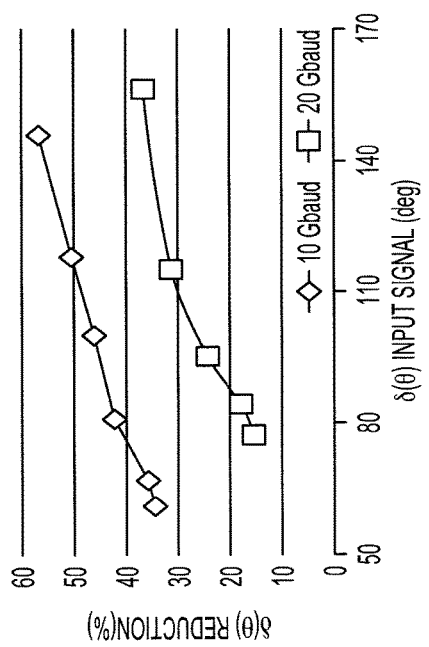
FIG. 7C is a graph of percentage phase noise reduction for the BPSK signals according to an aspect of the invention.

The results of the experimental setup of FIG. 5 are illustrated in FIGS. 7-9. FIGS. 7A-7B illustrate the constellations of before and after the phase-sensitive regeneration at different phase noise levels for a 10 Gb/s signal and a 20 Gb/s signal, respectively. When the phase noise varies, the constellations and the error-vector-magnitude (EVM) values for the 10 Gb/s and 20 Gb/s signals output as shown in FIGS. 7A-7B. For example, the phase noise of level-1, the phase regeneration reduces the EVM by up to 39% for the 10 Gb/s signal and up to 31% for the 20 Gb/s signal. FIG. 7C illustrates the percentage of phase noise reduction for the 10 Gb/s signal and the 20 Gb/s signal on the BPSK signal. Up to a 56% reduction in phase noise deviation is achievable at the high input phase noise levels.

Figure 8A:
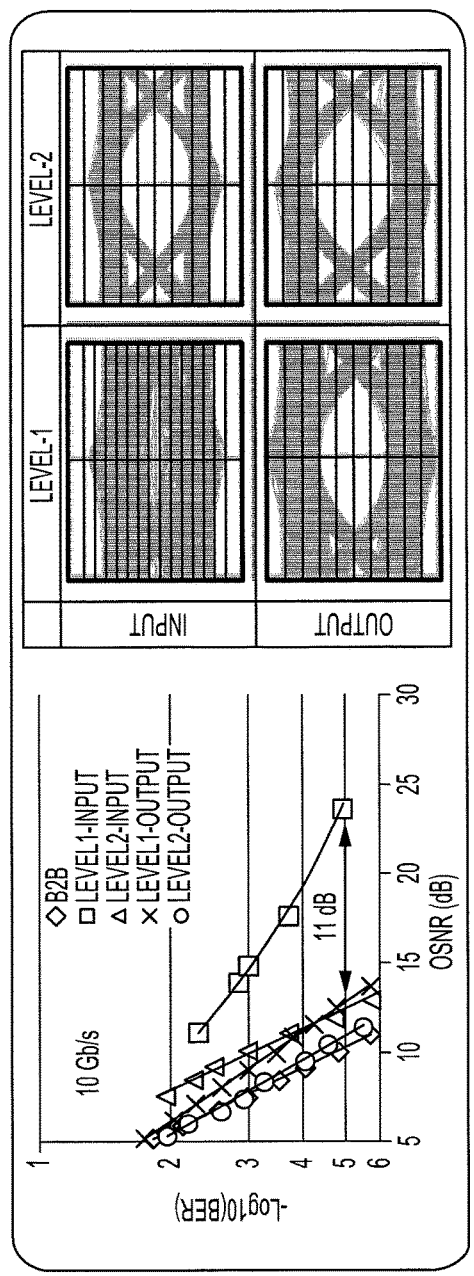
FIGS. 8A-8B are graphs of the bit error rate (BER) improvement for phase noises of the BPSK signals at 10 Gb/s and at 20 Gb/s, respectively, according to an aspect of the invention.
Figure 8B:
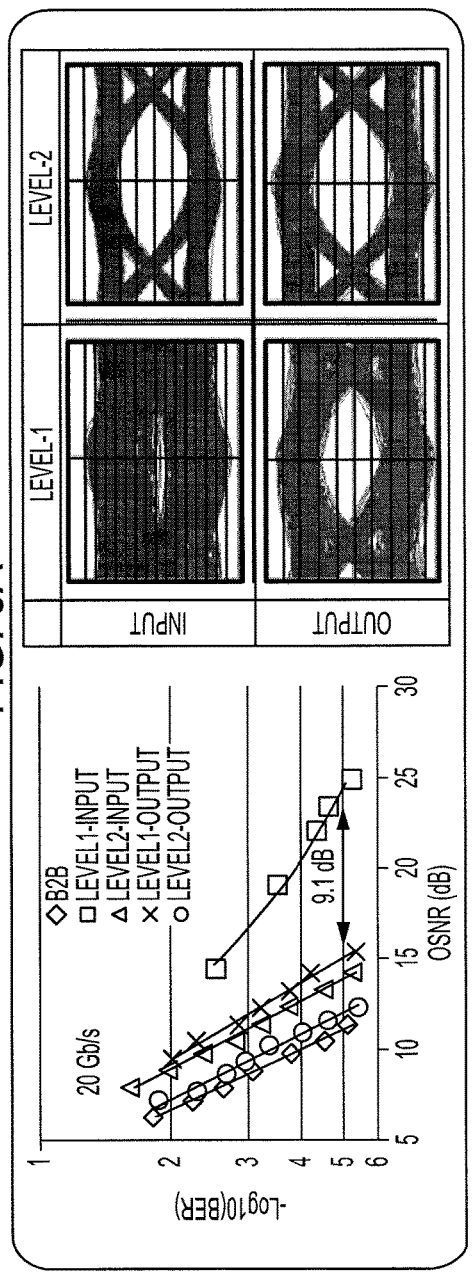

FIGS. 8A-8B illustrate the bit error rate (BER) improvement for phase noises of level-1 and level-2 at 10 Gb/s and at 20 Gb/s, respectively. Both bitrates, before regeneration and at BER of $10^{-5}$, level-1 phase noise cause the eye to degrade with at least 12 dB penalty compared to back-to-back (B2B), and level-2 phase noise cause 2 dB of degradation. After phase regeneration, improvement for the level-2 output was 1.5 dB for both bitrates, and the level-1 output gained 11 dB for the 10 Gb/s and 9.1 dB for the 20 Gb/s case at $10^{-5}$ BER.

Figure 9A:
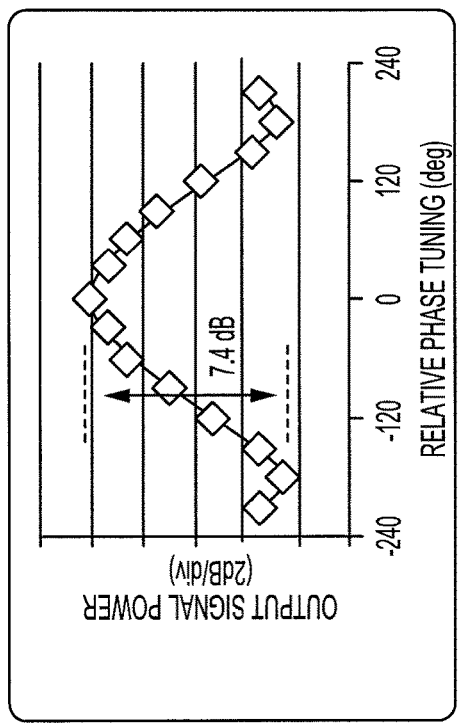
FIGS. 9A-9C are graphs that show the impact of tuning different parameters on the regenerator stability and performance for the 10 Gb/s signal according to an aspect of the invention.
Figure 9C:
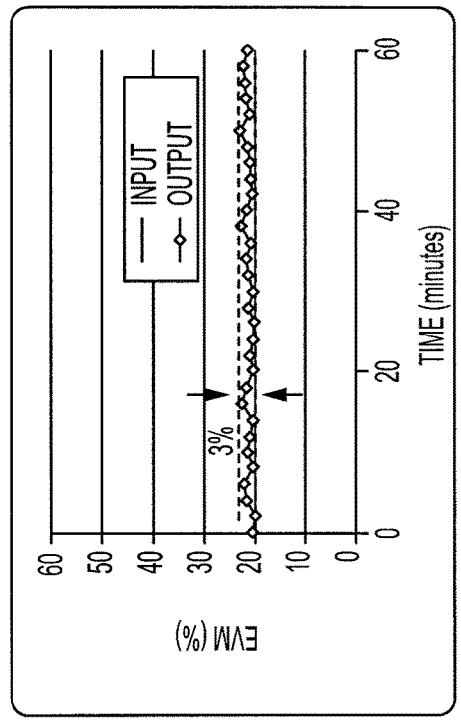
Figure 9B:
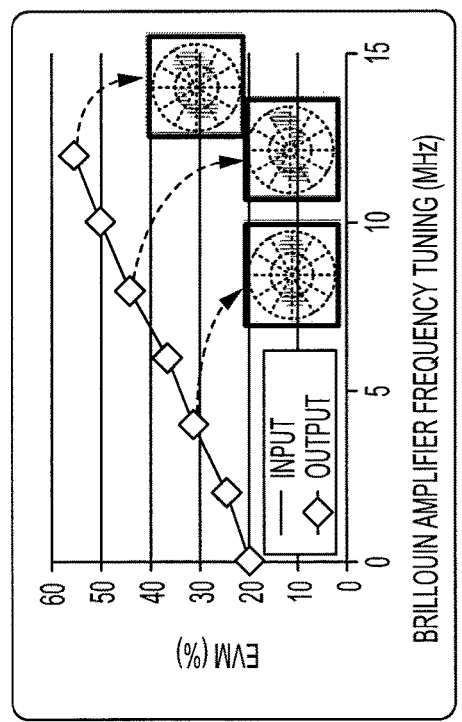

FIGS. 9A-9C illustrate the impact of tuning different parameters on the regenerator stability and performance for the 10 Gb/s signal with a phase noise of level-2. FIG. 9A shows a phase sensitive dynamic range (PSDR) of 7.4 dB after measuring the output signal power using the LCoS filter to tune the pump phase. FIG. 9B shows the EVM of the output signal when the Brillouin gain frequency is tuned. The phase regeneration lowers the EVM down from 51.7% to 20.3%. The EVM after regeneration may exceed the EVM of a noisy input signal if the frequency drifting that occurs between the idler and the Brillouin amplifier pump of around 10 MHz. FIG. 9C illustrates the stability of the phase-regeneration system when the slave laser has enabled frequency-locking. When the slave laser has enabled frequency-locking, the measured EVM changes within only 3%.

Figure 10:
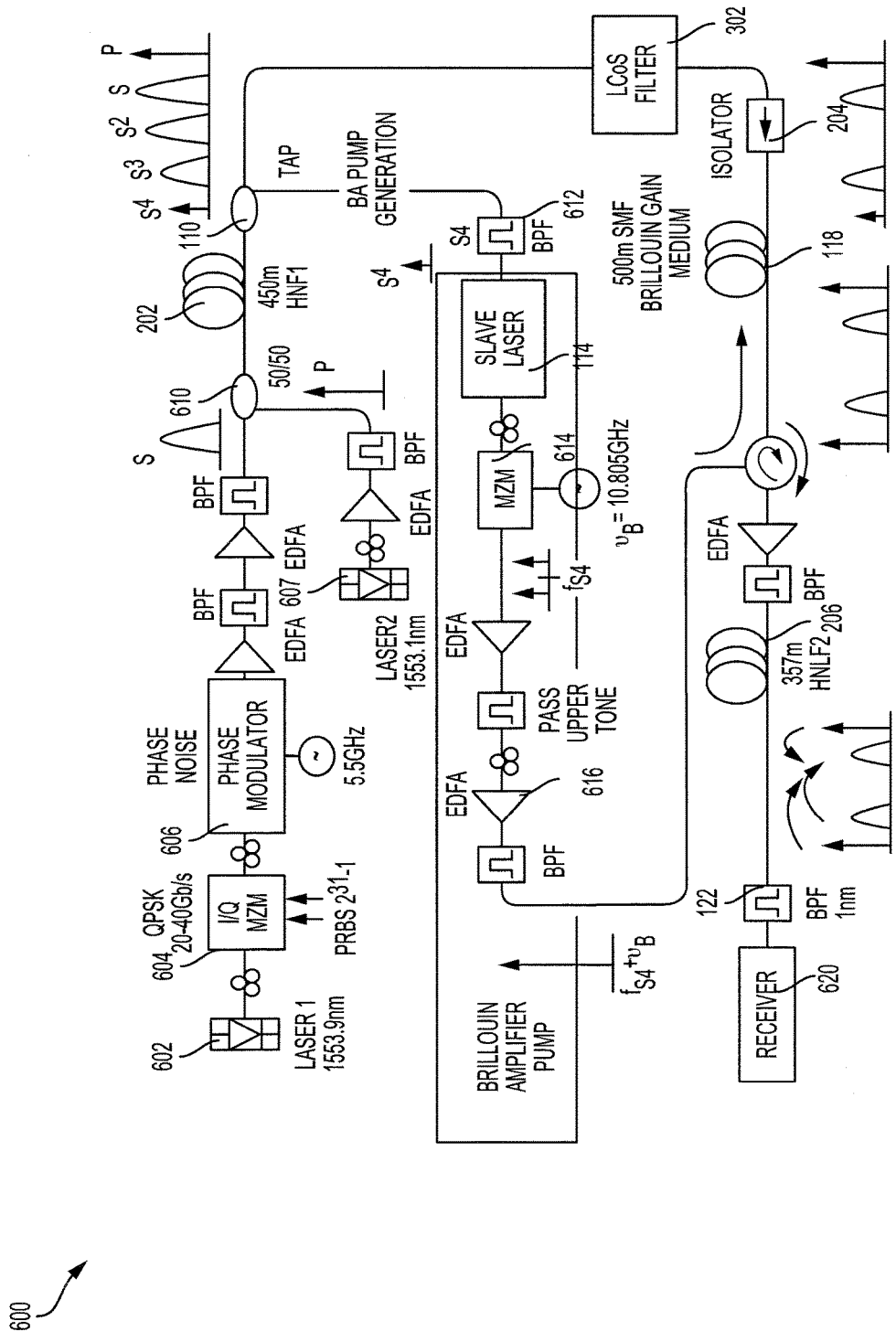
FIG. 10 is a system diagram of an experimental setup of the phase regeneration system of FIG. 3 that carries the QPSK signal according to an aspect of the invention.

FIG. 10 is a system diagram 600 of an experimental setup of the phase regeneration system 100 of FIG. 3 that carries the QPSK signal. The experimental setup that is depicted in FIG. 10 uses a modulated 1-kHz line-width laser 602 at 1553.9 nm with QPSK data at 20 Gb/s and 40 Gb/s using a $2^{31}-1$ Pseudo-Random Binary Sequence (PRBS) pattern in an I/Q Mach-Zehnder modulator (MZM) 604. The phase noise is loaded using a phase modulator 606 driven by a 5.5 GHz tone. The signal and a CW pump 607 at 1553.1 nm are amplified, combined in a 50/50 coupler 610, and then sent together into a 357 m HNLF1 202 with a zero-dispersion wavelength (ZDW) of 1556 nm, where the signal and pump power levels are ~20 dBm.

Figure 11A:
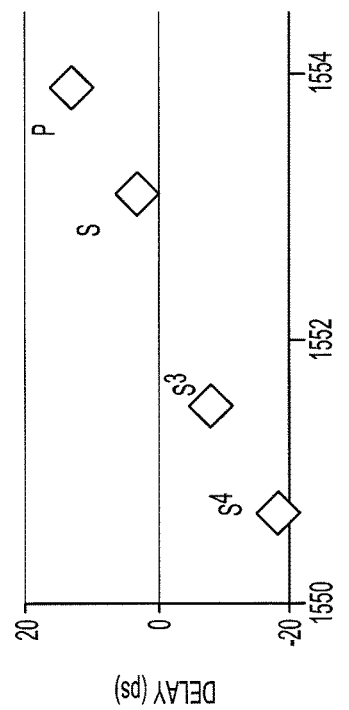
FIG. 11A is a graph of the spectrum of the signal after generating the higher harmonics according to an aspect of the invention.
Figure 11C:
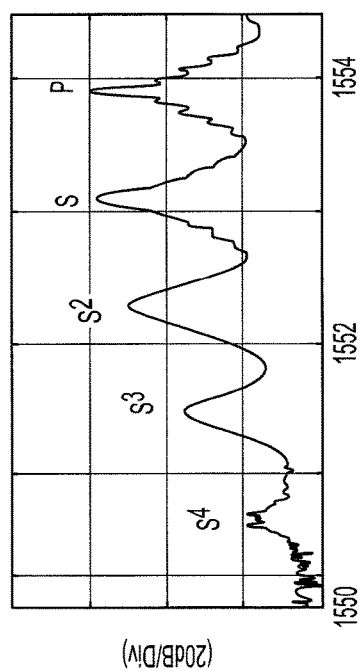
FIG. 11C is a graph of the QPSK signal outputted from the gain medium before and after amplifying the fourth harmonic according to an aspect of the invention.
Figure 11B:
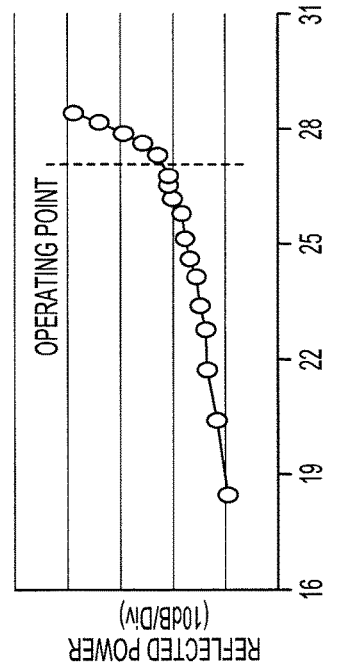
FIG. 11B is a graph of the delays applied by the filter to compensate for the dispersion induced walk-off in the gain medium according to an aspect of the invention.

The HNLF1 output, as shown in FIG. 11A, goes into an LCoS filter 302 which is used to attenuate the signal, S, block the second harmonic, $S^2$, adjust relative phases and compensate for delays that will be induced by dispersion walk-off in the upcoming 500 m SMF, as shown in FIG. 11B. Afterwards, LCoS output is sent into the gain medium 118, such as the SMF. The SMF output is shown in FIG. 11C before and after amplifying the fourth harmonic, $S^4$. The Brillouin Amplification (BA) pump is generated by selecting the fourth harmonic using the filter 112, such as the bandpass filter (BPF) 612 and adjusting a slave laser 114 to frequency-lock onto the fourth harmonic using a temperature controller in the BA pump generation tap.

Figure 11D:
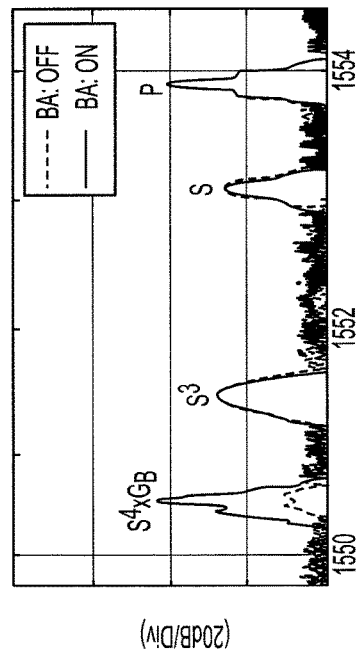
FIG. 11D is a graph of the operating point of the Erbium Doped Fiber Amplifier (EDFA) according to an aspect of the invention.
Figure 11F:
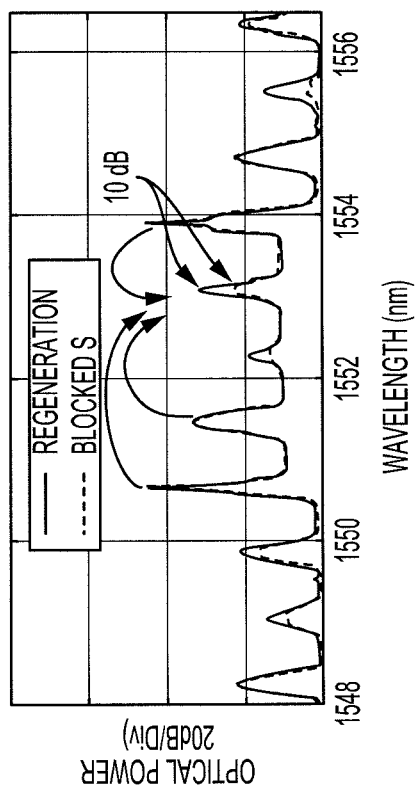
FIG. 11F is a graph of the output of the second highly nonlinear fiber (HNLF2) when the phase-regeneration system is regenerating according to an aspect of the invention.
Figure 11E:
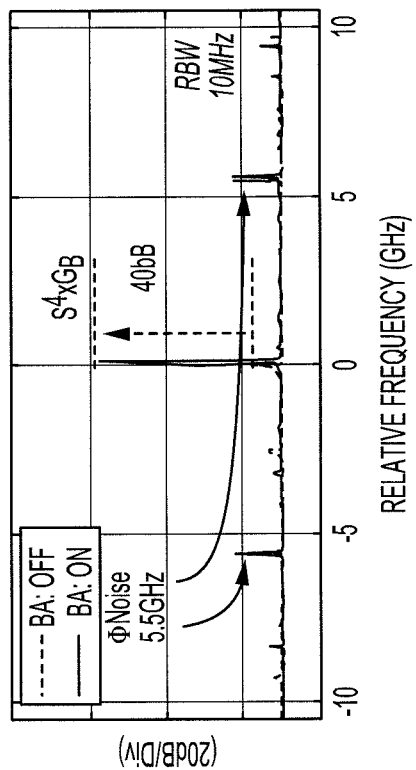
FIG. 11E is a graph of the spectrum of the fourth harmonic showing that the fourth harmonic is amplified according to an aspect of the invention.

The slave laser 114 output is frequency up-shifted in a frequency shifter 116, such as an MZM 614, biased at null and fed a $v_B$=10.805 GHz tone. A sharp filter is then used to pass only the upper tone needed for Brillouin amplification, which is boosted in an EDFA 616 and filtered before reaching the 500 m SMF with a power of ~27 dBm corresponding to the operating point shown in FIG. 11D. The operating point is the point at which the phase-regeneration system achieves the most gain without adding a significant amount of noise. Any additional power beyond the operating point adds noise instead of amplifying the signal. FIG. 11E shows the spectrum of the fourth harmonic after the SMF which is captured using the 10 MHz optical spectrum analyzer (OSA) where the fourth harmonic is found has a ~40 dB gain while higher harmonics of phase noise do not gain amplification.

Finally, the pump, signal, third and fourth harmonics of the signal are amplified in an EDFA, set to 26 dBm, and sent into the regeneration stage of a 375 m HNLF2 206 with a ZDW of 1545 nm and operating with a stimulated Brillouin scattering (SBS) of −10 dBm. FIG. 11F shows the HNLF2 output when the phase-regeneration system is regenerating, and when the signal is blocked to observe the ~10 dB power difference between the signal and third harmonic. The regenerated output signal is filtered and sent back to a 80 G sample/s coherence receiver 620 for analysis.

Figure 12:
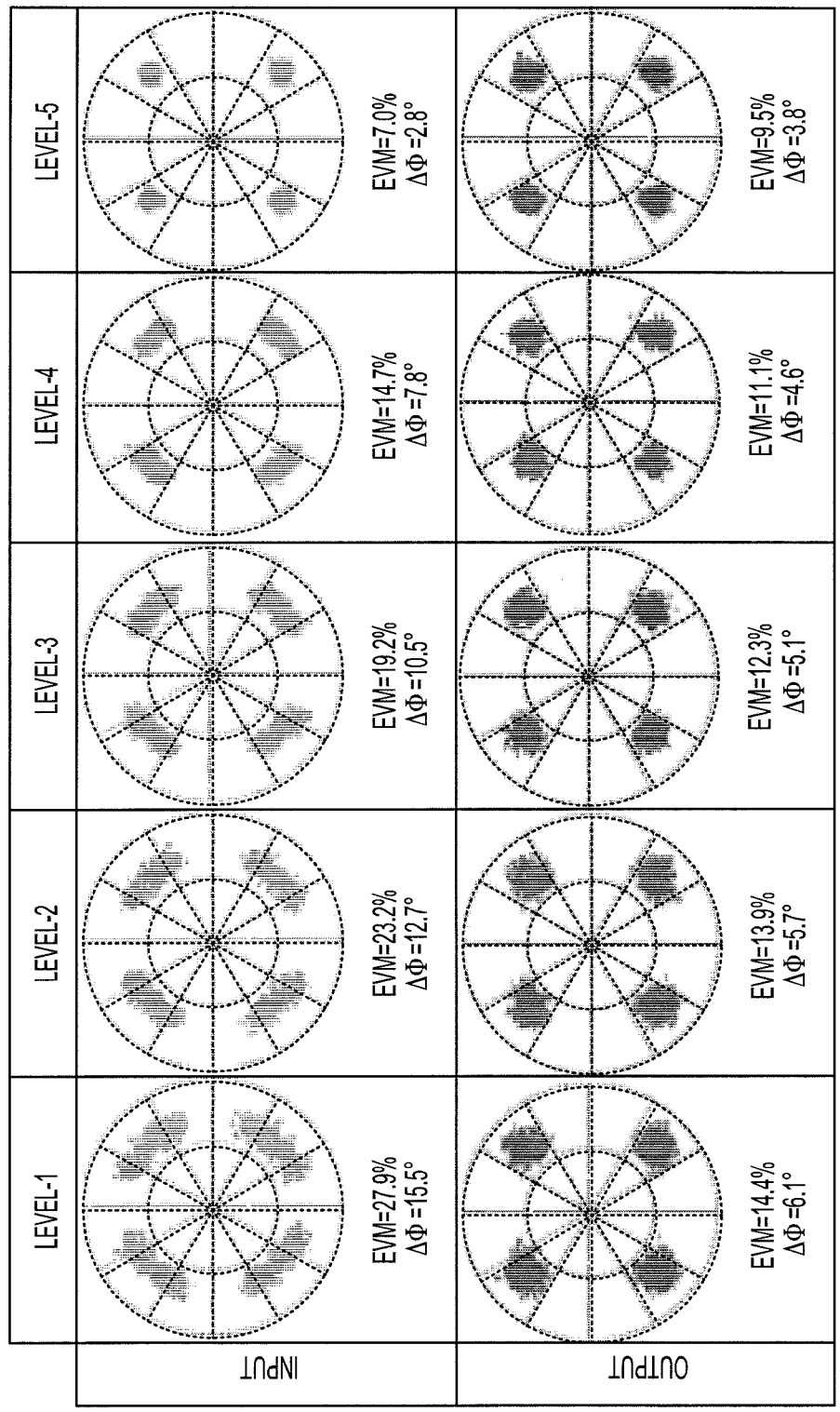
FIG. 12 is a constellation graph of the 20 Gb/s QPSK signal loaded with a 5.5 GHz tone phase noise before and after the phase-sensitive regeneration according to an aspect of the invention.

The results of the experimental setup of FIG. 10 are illustrated in FIGS. 12-14. FIG. 12 illustrates the constellations of before and after the phase-sensitive regeneration for 20 Gb/s QPSK signal loaded with a 5.5 GHz tone phase noise. When the phase noise varies, the constellations and the error-vector-magnitude (EVM) values for the 20 Gb/s signals output as shown in FIG. 12. FIG. 13A illustrates the percentage of phase noise reduction for the QPSK signal. Up to a 65% reduction in phase noise variance and a 48% reduction in EVM is achievable at the high input phase noise levels.

Figure 13A:
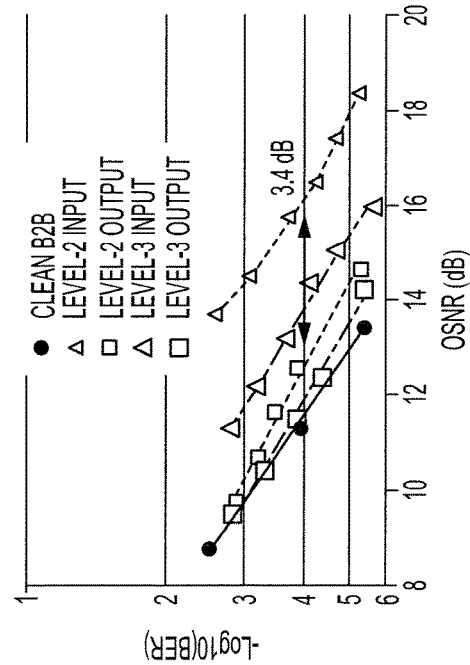
FIG. 13A is a graph of the error-vector-magnitude (EVM) and phase noise variance reduction corresponding to different phase noise variance input levels according to an aspect of the invention.
Figure 13B:
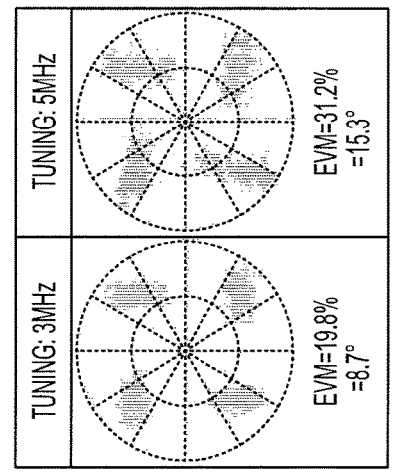
FIG. 13B is a graph of the BER performance improvement according to an aspect of the invention.
Figure 13C:
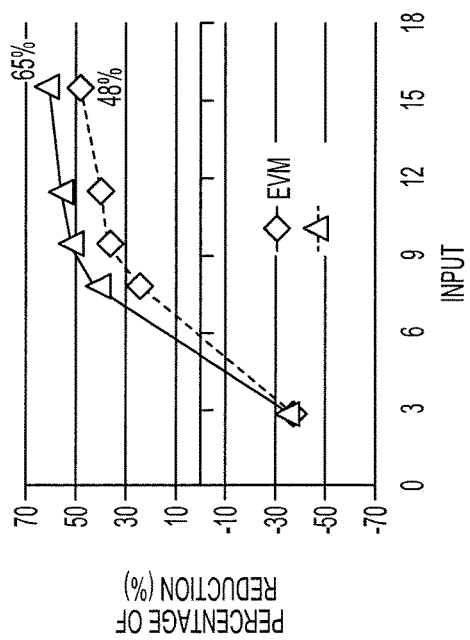
FIG. 13C is a graph of the effect to the phase regeneration performance when the BA pump frequency is tuned from the optimal shift according to an aspect of the invention.
Figure 13D:
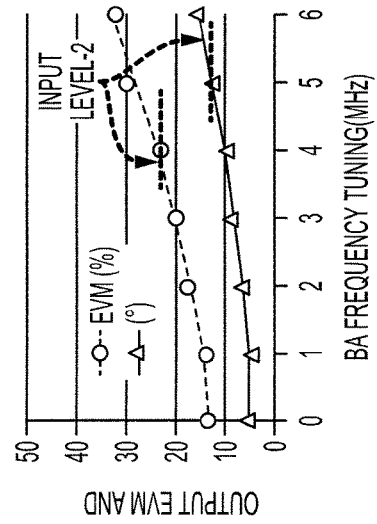
FIG. 13D is a graph of the effect of tuning the Brillouin amplification frequency according to an aspect of the invention.

FIG. 13B illustrates the bit error rate (BER) improvement of 3.4 dB for phase noise level-2. FIG. 13C illustrates the effect to the phase regeneration performance when the BA pump frequency is tuned from the optimal shift for when the input phase noise variance is level-2. The tuning results in the EVM exceeding the input EVM level after 4 MHz. The examples of the effect of the tuning of the frequency on the constellations are shown in FIG. 13D where the BA pump frequency adds a phase shift to the regeneration process.

Figure 14A:
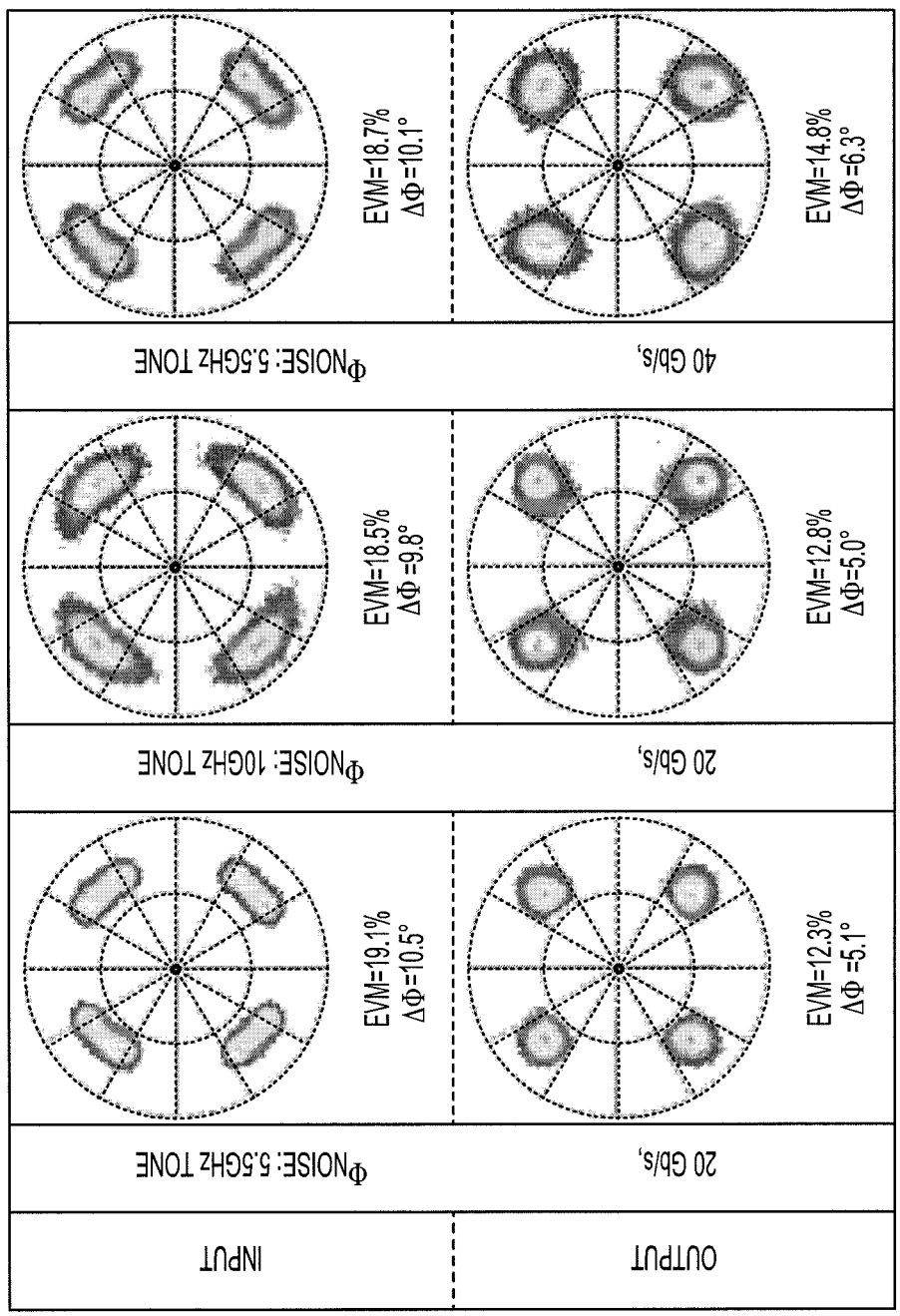
FIG. 14A shows the phase regeneration with an input noise variance according to an aspect of the invention.
Figure 14C:
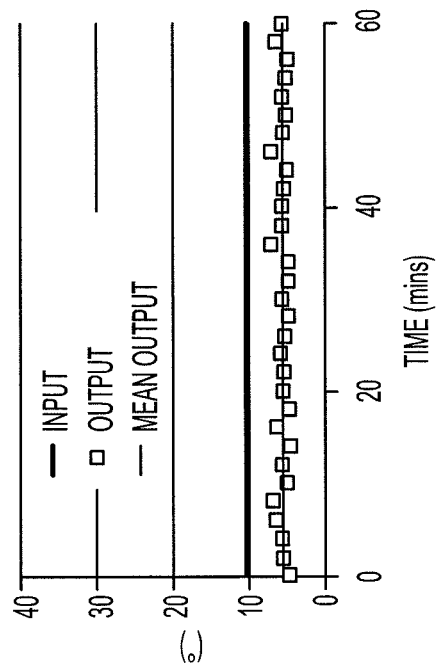
FIGS. 14B-14C show the results of an EVM and phase noise variance stability test according to an aspect of the invention.
Figure 14B:
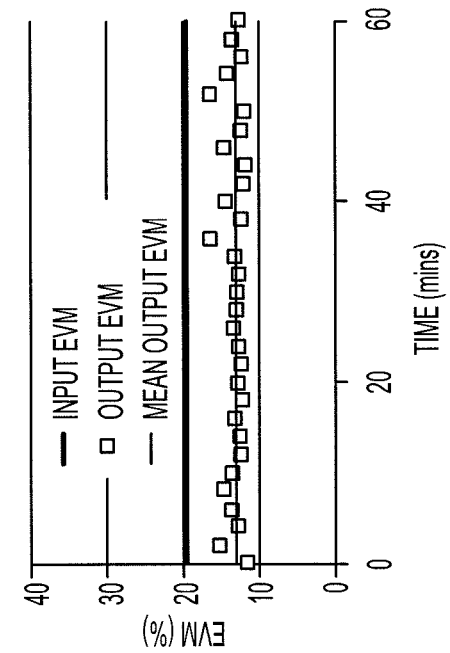

FIG. 14A illustrates phase regeneration with an input phase noise variance of approximately 10° for the 20 Gb/s and 40 Gb/s signals. The regeneration performance for the 40 Gb/s signal is slightly degraded in comparison to the 20 Gb/s signal. FIGS. 14B-14C illustrate the phase-regeneration performance over an hour without adjustments or a PLL for the 20 Gb/s QPSK with 5.5 GHz phase noise. When the input EVM and phase noise variance are 19.2% and 10.5°, the mean output EVM and phase noise variance is 13% and 5.4°, respectively.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for phase-sensitive regeneration, comprising:
a data channel;
one or more pumps coupled with the data channel; and
a mixing stage coupled with the data channel and is for processing a data signal that is combined with an output of the one or more pumps and an idler or higher harmonic to produce a combined signal, the mixing stage comprising:
a coupler for splitting the data channel into at least two paths including:
a first path having a Brillouin gain medium to keep the one or more pumps and the data channel phase-locked, and
a second path having a slave laser configured to form a frequency locked Brillouin amplifier pump that amplifies the idler or higher harmonic and a filter configured to filter the idler or higher harmonic from the combined signal, the second path being independent of the first path.

2. The system of claim 1, wherein Brillouin gain medium is formed from material, such as glass, silica, or silicon, or optical fibers including highly nonlinear fibers, dispersion shifter fibers, dispersion stable fibers or dispersion compensating fibers, wherein the idler or higher harmonic is amplified using a counter propagating Brillouin pump.

3. The system of claim 2, wherein the mixing stage comprises:
a first nonlinear mixing device to generate the idler or higher harmonic; and
a second nonlinear mixing device to generate and add a conjugate signal or a higher harmonic to the signal to perform phase regeneration.

4. The system of claim 3, wherein the first nonlinear mixing device and the second nonlinear mixing device are made from an $\chi_2$ or $\chi_3$ material or other nonlinear material.

5. The system of claim 1, wherein the second path includes a frequency shifter that frequency up-shifts the idler or higher harmonic by a Brillouin gain frequency shift.

6. The system of claim 1, wherein the data channel carries a phase-shift-keyed (PSK) data signal.

7. The system of claim 1, wherein the mixing stage comprises at least one of an isolator or a circulator for directing the data signal in a single direction or a liquid crystal on silicon (LCoS) filter for blocking a harmonic and attenuating the data signal.

8. A system for phase-sensitive regeneration, comprising:
a data channel for carrying a signal;
one or more pumps coupled with the data channel and configured to output a pump;
a first nonlinear material coupled with the data channel for processing the signal that is combined with the pump and configured to generate and combine an idler or higher harmonic with the pump and the signal to produce a combined signal;
a coupler to split the combined signal into a plurality of paths including a first path and a second path, the second path being independent of the first path;
a filter for filtering the idler or higher harmonic from the combined signal, the filter being located on the second path; and
a slave laser for amplifying the idler or higher harmonic, the slave laser being located on the second path.

9. The system of claim 8, further comprising a frequency shifter that up-shifts the amplified idler or higher harmonic a threshold frequency.

10. The system of claim 8, further comprising:
a second nonlinear material configured to:
receive the amplified idler or higher harmonic, the signal and the pump,
generate a conjugate signal or a higher harmonic that is added to the signal, pump and the amplified idler or higher harmonic to form a phase-regenerated signal, and
output the phase-regenerated signal; and
a bandpass filter that is configured to:
receive the phase-regenerated signal, and
filter the phase-regenerated signal to form an attenuated signal, and
output the attenuated signal.

11. The system of claim 8, wherein the signal in the data channel is a quadrature phase-shift keying (QPSK) signal or a binary phase-shift keying (BPSK) signal.

12. The system of claim 8, wherein phase relationships of the amplified idler or higher harmonic, the pump and signal remain locked allowing stable phase regeneration without path separation and a phase-locked loop.

13. A method for phase-sensitive regeneration of a signal, comprising:
generating, using a first nonlinear material, an idler or higher harmonic for the signal;
splitting, using a coupler, the signal into at least two paths including a first path and a second path, the second path being independent of the first path;
filtering, in the second path and using a filter, the idler or higher harmonic from the signal;
amplifying, in the second path and using a slave laser, the idler or higher harmonic by a gain;
frequency up-shifting, in the second path and using a frequency shifter, the idler or the higher harmonic by a Brillouin gain frequency shift; and
providing, in the second path and using the frequency shifter, the up-shifted signal to a gain medium as a counter propagating Brillouin pump.

14. The method of claim 13, wherein the coupler is a 90/10 coupler and the first path is the 90% tap and the second path is the 10% tap.

15. The method of claim 13, wherein the Brillouin gain frequency shift is based on a material of the gain medium.

16. The method of claim 13, wherein the signal is a phase-shift-keyed (PSK) signal that uses any number of phases.

17. The method of claim 13, further comprising amplifying, in the gain medium in the first path and using the counter propagating Brillouin pump, the idler or the higher harmonic, wherein the idler or higher harmonic is amplified without path separation from the signal and a pump.

18. The method of claim 13, further comprising:
amplifying, using an Erbium Doped Fiber Amplifier (EDFA), the signal, a pump and the idler or higher harmonic;
sending the signal, the pump and the idler or higher harmonic to a second nonlinear material for phase regeneration;
generating a conjugate signal of the signal;

adding the conjugate signal to the signal; and
outputting the signal.

\* \* \* \* \*